United States Patent [19]

Eimer et al.

[11] Patent Number: 5,255,977
[45] Date of Patent: Oct. 26, 1993

[54] METHOD AND DEVICE FOR MONITORING THE EFFICIENCY OF A CONDENSER

[75] Inventors: Klaus Eimer, Ratingen; Wolfgang Czolkoss, Dortmund, both of Fed. Rep. of Germany

[73] Assignee: Taprogge GmbH, Wetter-Ruhr, Fed. Rep. of Germany

[21] Appl. No.: 651,339

[22] PCT Filed: May 29, 1990

[86] PCT No.: PCT/EP90/00861
§ 371 Date: Jan. 13, 1992
§ 102(e) Date: Jan. 13, 1992

[87] PCT Pub. No.: WO90/15298
PCT Pub. Date: Dec. 13, 1990

[30] Foreign Application Priority Data
Jun. 7, 1989 [DE] Fed. Rep. of Germany ....... 3918531

[51] Int. Cl.$^5$ ...................... G01K 17/16; G01K 17/10
[52] U.S. Cl. ................................... 374/41; 73/861.95; 374/39; 165/11.1
[58] Field of Search .................... 374/39, 40, 41; 73/861.95; 165/11.1

[56] References Cited

U.S. PATENT DOCUMENTS

| | | | |
|---|---|---|---|
| 2,776,565 | 1/1957 | Hudson | 73/861.95 |
| 3,971,252 | 7/1976 | Onoda | 374/41 |
| 4,048,852 | 9/1977 | Sakakibara et al. | 374/41 |
| 4,458,709 | 7/1984 | Springer | 73/861.95 |
| 4,482,006 | 11/1984 | Anderson | 374/41 |
| 4,485,449 | 11/1984 | Knauss | 374/41 |
| 4,491,024 | 1/1985 | Miller, Jr. | 73/861.95 |
| 4,628,743 | 12/1986 | Miller, Jr. et al. | 73/861.95 |
| 4,773,023 | 9/1988 | Giardina | 374/41 |
| 5,026,171 | 6/1991 | Feller | 374/41 |

FOREIGN PATENT DOCUMENTS

| | | | |
|---|---|---|---|
| 2639729 | 3/1978 | Fed. Rep. of Germany | 73/861.95 |
| 2901270 | 7/1980 | Fed. Rep. of Germany | 374/41 |
| 3243198 | 5/1984 | Fed. Rep. of Germany | 374/41 |
| 0970043 | 12/1950 | France | 374/41 |
| 0315040 | 9/1971 | U.S.S.R. | 73/861.95 |
| 1084653 | 9/1967 | United Kingdom | 73/861.95 |

Primary Examiner—William A. Cuchlinski, Jr.
Assistant Examiner—Diego F. F. Gutierrez
Attorney, Agent, or Firm—Banner, Birch, McKie & Beckett

[57] ABSTRACT

The invention relates to a method and to an apparatus for monitoring the heat transfer and therefore the efficiency of a condenser. A water column is formed by shutting off a condenser pipe which assumes the steam temperature $T_s$ and whose outflow time after the resumption of the flow can be utilized for measuring the flow velocity. With the knowledge of the water inlet temperature $T_1$ and the water outlet temperature $T_2$ measured on the same condenser pipe, it is possible to very accurately establish the heat transfer through the measured condenser pipe, so that on the basis thereof it is e.g. possible to operate a cleaning system with foam rubber balls. Thus, each fraction of the possible efficiency of the condenser is exploited.

22 Claims, 5 Drawing Sheets

METHOD AND DEVICE FOR MONITORING THE EFFICIENCY OF A CONDENSER

BACKGROUND OF THE INVENTION

1. Field of the Invention

The invention relates to a method and to an apparatus for monitoring the heat transfer and thus the efficiency of a condenser.

The efficiency of condensers in power stations is mainly dependent on the heat transfer from the steam, via the condenser tubes into the cooling water, which is once again decisively influenced by the degree of contamination of the tubes as a result of deposits or corrosion. The measurement of the actual heat transfer on a condenser is difficult if it shall be accurate and shall reveal at an early stage any deterioration before any detectable performance decrease occurs. The usual method of monitoring a condenser by measuring the steam temperature or steam pressure, the cooling water inlet and outlet temperature, as well as the condensate quantity flow and also the cooling water flow is too imprecise in order to detect at an early time contaminations of the tubes.

The high performances of modern power station units lead to high steam and cooling water flows with correspondingly large cross-sections of the cooling water and steam paths, which require an accurate measurement of the temperature and speed distribution in said cross-sections, in order to make it possible to obtain an adequately precise information of the effective mean values.

This method is not particularly accurate, because over and beyond it numerous other parameters also influence the efficiency, so that all that can be established therewith is the deterioration when it has reached an alarming extent. Therefore the condenser cleaning system, which keeps the condenser tubes clean by means of circulating elastic cleaning members is consequently operated more on the basis of general empirical values than the specific needs of the individual power plants. In many cases this is sufficient to obtain a satisfactory condenser state, but in other cases leads to "undercleaning", i.e. to deposits, or to "overcleaning", i.e. to corrosion in the case of copper alloys. Thus, an optimum operation of the condenser through an optimum cleaning using this method of standard operation supervision alone is not possible.

2. Description of the Related Art

From the German publication 37 05 240.3 a measuring method is known, in which one or more condenser tubes of a condenser are concretely measured with respect to the cooling water inlet temperature, the outlet temperature and the flow velocity, the steam temperature being measured on an adjacent tube which is shut down. The advantage is that a direct measurement takes place on a tube actually participating in the condensing of steam, so that it is possible to exclude marginal conditions, which can otherwise occur in special tubes separated for the measurement of bypass-operated model condensers. For determining the cooling water flow velocity, either foreign substances, such as saline solutions or the like are added to the cooling water at the tube inlet, or marked sponge rubber balls are used. The flow velocity in the tube is determined from the passage time established by corresponding sensors. Both measuring methods require a relatively high expenditure, so that certain difficulties are to be expected in the acceptance of such installations.

An attempt has also been made to determine the degree of contamination of the condenser tubes by measuring the pressure drop from the inlet side to the outlet side. However, it has been found that there are rough and smooth impurities, which differently influence the pressure drop, so that by using such a differential pressure measurement it is not possible to obtain sufficiently accurate information on the heat transfer.

SUMMARY OF THE INVENTION

The object of the present invention is to so improve the known method and the known apparatus, that it is possible to carry out the measurement without marking substances or marked balls and also that the apparatus setup can be further reduced, whilst ensuring a high reliability of the measurement.

For achieving this object a method for monitoring the heat transfer and therefore the efficiency of a condenser is proposed, in which the steam temperature $T_s$ and the water outlet temperature $T_2$ (after the flow through a condenser tube) are measured at the end of the tube with the aid of a temperature probe, together with the water flow velocity on its way through the tube in order to calculate with the water inlet temperature $T_1$ of the cooling water the heat transmission coefficient and quantities derived therefrom. For measuring the steam temperature $T_s$, the flow through the tube is temporarily interrupted, so that the water column contained therein assumes the steam temperature $T_s$ and thus the measurement result of the temperature probe at the end of the tube is evaluated as the steam temperature $T_s$ right after reopening of the tube. For measuring the water flow velocity, the time is measured which elapses from the reopening of the tube to the temperature drop from the steam temperature $T_s$ to approximately the steady water outlet temperature $T_2$.

The invention also proposes an apparatus for monitoring the heat transfer and therefore the efficiency of a condenser with a thermometer in the water entrance area for determining the water entry temperature $T_1$ of the water, with a thermometer probe in the end region of a specific condenser tube for determining the water outlet temperature $T_2$ and with a device for evaluating the measured values, particularly the heat transfer from the steam into the cooling water, which is characterized in that this tube can be temporarily plugged with the aid of a sealing element.

The invention is based on the finding that with the temporary closure of the condenser tube to be measured, conditions are created which, with the simplest means, allow the following evaluations and/or measurements:

1. The water column which is prevented from flowing through, assumes the steam temperature after a certain time. Allowing this water column to flow out after ending the blockage allows measurement of the steam temperature at the condenser tube outlet.

2. In the steady state, i.e. with a normally operating condenser, the same measuring probe allows measurement of the water outlet temperature $T_2$ as a permanently retrievable measured quantity.

3. The running out of the water column having the steam temperature creates the possibility of measuring the flow velocity, because the time at which the flow recommences is known and the temperature transition from the end of the water column to approximately the water outlet temperature $T_2$ is measurable with a good approximation, so that the water flow velocity can be determined via the known tube length. To do so, acceleration of the water column must be taken into account.

4. The flowing past the temperature probe of the water column in the outlet area of the condenser tube to be measured supplies a steam temperature distribution over the condenser tube length which, as a result of air in the condenser or steam flow distribution, is not constant. With the aid of this evaluation information can be obtained on the operation of the air suction pumps, the intensity of condenser cooling and to a certain extent also on the possible leaks in the steam line in the low pressure range.

The constructional setup required for the invention is limited to determining the water inlet temperature with a normal thermometer at an approximately random point in the cooling water entrance of the condenser, to a movable sealing element for sealing the condenser pipe to be measured and to the installation of the temperature probe in the condenser tube outlet area, namely either directly on the actual tube, or riding on the sealing element. It is obviously necessary to have an evaluating device in the form of a microprocessor and corresponding display means, for instance a plotter, a printer or a screen; such display possibilities can obviously also be provided, one beside the other.

The temporary interruption of the flow through the condenser tube to be measured can be brought about by a sealing element at the tube inlet or outlet. It is merely a question of stopping the water column trapped in the tube and of allowing it to be heated up to the steam temperature. Of course, at the unsealed end there is a mixing with the cooling water from the ambience, but this area is relatively small as a result of the narrowness of conventional condenser tubes of approximately 20 to 30 mm. It is also possible to provide at this point an automatic, flow-dependent flap, e.g. in the form of rubber flaps held on the outer edge and cut out in sector-like manner, so as to keep said mixing to a minimum.

In order to complete the picture of the operation of a condenser, it may be appropriate to measure on the same condenser plurality of tubes as to the heat transfer. If the condenser is subdivided from the outset, it is possible to carry out one measurement per section, alternating the selection of the tubes to be measured so as to obtain a good overall evaluation. It is always a question of also covering those areas, which as a result of the flow conditions or due to the initial steam contact, are at particular risk of contamination. As the apparatus setup required for performing the invention is minimal, the installation of several sealing elements and temperature probes hardly matters when they are set against the possible savings resulting from operating the condenser with an optimum efficiency.

When the water column runs out of the condenser tube to be measured at the end of the period chosen for heating to steam temperature, there is necessarily a mixing of the water column with the entering cooling water on the cooling water inlet side. Therefore, the precise end of the water column as to a temperature jump is not precisely defined. There is also a relatively rapid temperature drop with a following slower temperature drop, which results from the fact that the tube initially heated to the steam temperature is now cooled by the entering cooling water in a few seconds to a new equilibrum temperature. It is therefore appropriate to fix a definition for the end of the water column making it possible to obtain in a reproducible manner sufficiently accurate measuring results.

One possibility consists e.g. in predetermining a percentage temperature drop from the previously prevailing average steam temperature $T_2$, e.g. by 30 or 40% of the temperatue difference $T_s - T_2$. Another way to fix the said end of the water column with the aid of a temperature measurement is to calculate a reversing point, which is obtained in the functional representation of the temperature over the time after the intially marked temperature drop and before the following approach to the new equilibrum temperature. According to a third definition a tangent can be placed at said reversing point which intersects the average steam temperature $T_s$ at a specific point. This intersection establishes a specific time within the temperature transition, which like the other two defined times can be used for the mathematical evaluation of the time for the outflow of the water column.

It is obviously necessary to firstly speed up the water column before it reaches the through-flow velocity of the adjacent tubes, i.e. is representative for the flow velocity. The acceleration phase can be very easily determined with the aid of a differential equation, so that when the length of a condenser tube is known and the time for the outflow of the water column from the tube has been measured, the actual through-flow velocity can be determined with an error of less than 3% with the aid of a microprocessor. If the influence of different tube roughnesses is taken into account by the measurement of the pressure loss of the condenser, then the error can be reduced to below 1%. These bases have been worked out in tests and the most favourable results have been obtained when using the said intersection between the tangent at the reversing point of the temperature gradient with the average steam temperature $T_s$. The determined measurement time is to be corrected with factors, which are theoretically determined and experimentally verified. These factors take account of the acceleration process, as well as beside others, mixing effects during the flow through the tube which are reproducible.

With the aid of the flow velocity through the condenser tube to be measured and with the knowledge of the tube diameter, it is possible to determine the volume flow, i.e. the quantity passing through the tube per unit of time. As the inlet temperature and the outlet temperature from the tube are also measured, it is possible to determine in this way the quantity of heat absorbed by the water per unit of time in the steady state. As it is possible to determine the steam temperature in the described manner the heat transmission coefficient k of the steam through the tube into the water can be calculated. For its assessment either, on new tubes, with the knowledge of the material, it is possible to calculate the heat transmission coefficient $k'$ or, on new tubes or tubes which are guaranteed to be free from deposits with the aid of special sponge rubber balls, a reference value according to the invention can be determined. By making a comparison with the reference value it is now relatively easy to evaluate the degree of contamination of the condenser in the area of the measured tube and, if the condition is too bad, to remedy such condition. The remedy is now brought about by circulating sponge rubber balls for cleaning purposes or, when the balls are worn, by feeding in new ones. It may be necessary to use special cleaning bodies or a chemical treatment depending on the tube material. All that is important in the invention is that it is in fact possible to measure the heat transfer on heat exchanger tubes in operation and to establish consequently the efficiency thereof.

It is known that the steam temperature is not constant over the tube length. Reasons for this are different pressure losses of the steam flow and locally differing concentrations of uncondensable gases. According to a further development of the inventive method, it is possible in a simple manner to evaluate the heat transfer on the steam side and therefore control the same by using the so-called Wilson method. In the Wilson method use is made of the phenomenon that the heat transmission resistance 1/k of a liquid flowing in a tube is a function of the liquid flow-through velocity and is proportional to $v^{-0.8}$. On plotting the heat transmission resistance over the varied flow velocity $v^{-0.8}$, then a line is obtained, which by extrapolation can be extended to the value of an infinite speed ($v^{-0.8}=0$). At this flow velocity there is no heat transmission resistance between the tube wall and the cooling water, so that at this point in the curve it is possible to directly read off the heat transmission resistance between the steam and the outside of the tube plus the known heat resistance through the tube wall.

The invention makes use of these findings. It is necessary to carry out several measurements in time succession with different cooling water flow velocities through a tube and the heat transmission coefficient measured. Thus, in the manner described hereinbefore a water column trapped in a tube is raised to the steam temperature. After opening the tube by a predetermined, constricted amount by drawing back the sealing element which had sealed the tube up to then, cooling water again flows through the tube but, as a result of the constricting action, at a lower speed. This speed is measured in the described manner and subsequently the heat transfer coefficient k is calculated with the measured temperatures.

This measurement is preformed successively for different speeds, so that a Wilson diagram can be produced. It is not a condition that the Wilson diagram is correctly drawn or expressed but it is sufficient to mathematically simulate the same, so that the extrapolation for the speed value Infinity is possible. After measuring four to six different speeds a sufficiently accurate value is available in order to evaluate the quality of the heat transfer from the steam to the tube. Thus, for the first time a reliable information is available on the heat transfer on the steam side. It has been found that not only air inclusions in the condenser can detrimentally influence the heat transfer, but also fouling on the steam side can occur, particularly as a result of magnetite deposits.

BRIEF DESCRIPTION OF THE DRAWINGS

Hereinafter embodiments of the invention which are shown in the drawing are described in greater detail. The drawings show.

DESCRIPTION OF THE PREFERRED EMBODIMENTS

Figure 1:
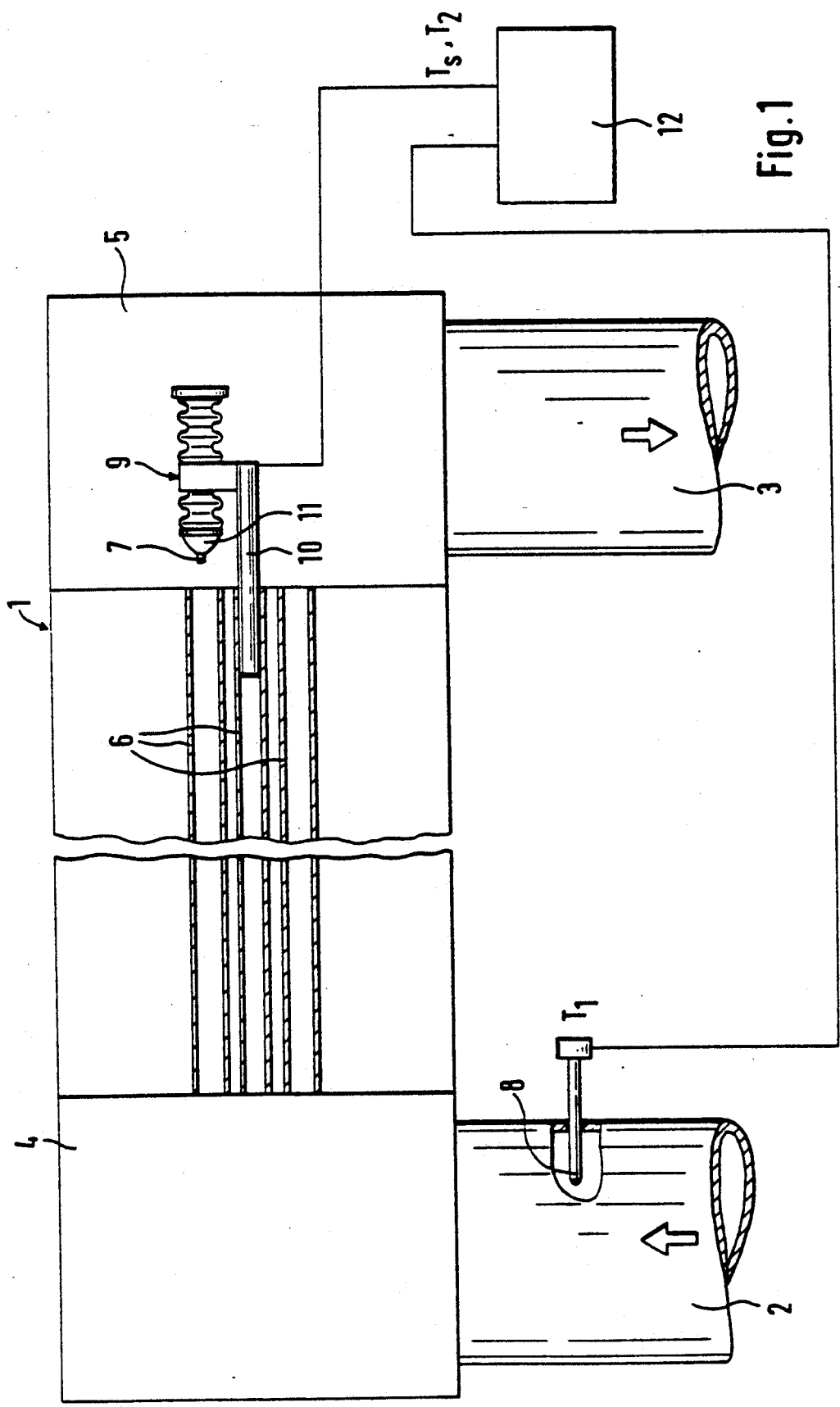
FIG. 1 a diagrammatic view of a steam condenser incorporating an apparatus according to the invention.

In FIG. 1 a steam condenser 1 is diagrammatically shown, in which in accordance with standard practice the steam line is not shown. The steam flows at right angles to the direction of the bundle of tubes through which the cooling water flows and at an appropriate point the steam line contains a connection for a vacuum pump for the sucking off the air which has collected in the condenser steam chamber.

For the purposes of condensing the steam, cooling water flows in from a main canal or a cooling tower via an intake 2 which leaves the condenser 1 via an outlet 3. For the uniform distribution of the cooling water over a bundle of condenser tubes 6 an intake chamber 4 is provided and for collecting the cooling water a similarly shaped outlet chamber 5 is provided at the other end of the condenser 1.

In order to determine the cleanliness factor, the heat transfer or the efficiency of the condenser 1, it is necessary to measure the cooling water inlet temperature $T_1$ and the cooling water outlet temperature $T_2$, which takes place with the aid of a thermometer 8 in the intake 2 on the one hand and with a temperature probe 7 within the outlet chamber 5 on the other hand. The temperature probe 7 is a component of an apparatus 9 for interrupting the through-flow within the condenser tube 6 to be measured. The apparatus 9 is fixed with the aid of a retaining tube 10 in the adjacent condenser tube. With the aid of a not shown device the sealing element 10 can be moved in such a way that it seals the end of the condenser tube 6. The sealing element is shown in its retracted position in FIG. 1.

Figure 3:
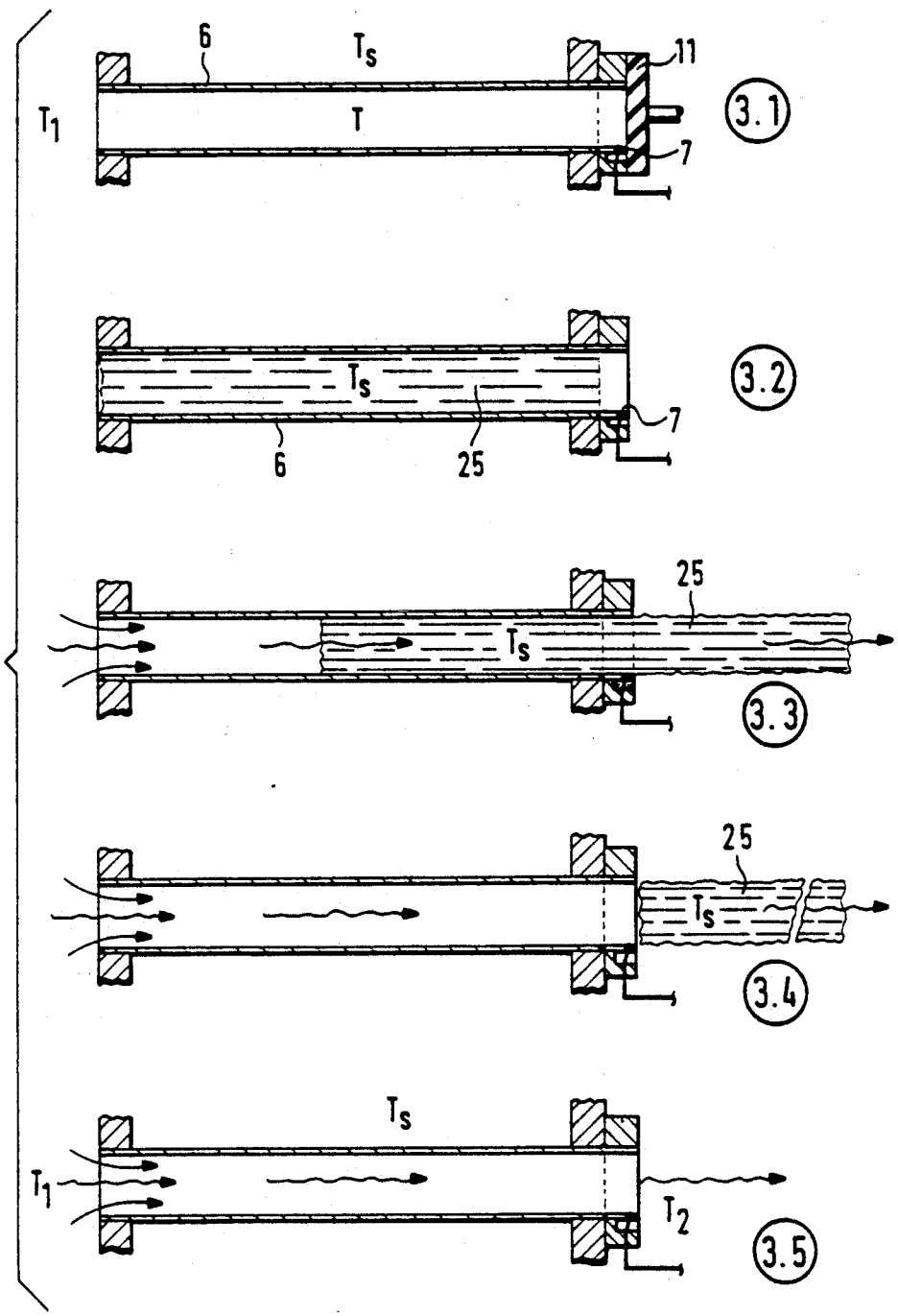
FIG. 3 a side view comprising five partial pictures of a diagrammatically represented condenser tube for illustrating the invention by means of a sequence of operations.

The represented components are already sufficient to allow a reliable evaluation of the degree of contamination of the condenser 1 with the aid of an evaluating means 12. The procedure will be described in greater detail in conjunction with FIG. 3. In FIG. 1 it is indicated that the evaluating means 12 is connected with the aid of lines to the thermometer 8 and the temperature probe 7. This is a particularly appropriate procedure. However, differing therefrom, it is also possible to provide wireless transmission at least from the temperature probe 7 to the means 12. The necessary power supply can be secured by batteries, by potential differences within the condenser 1 or by a small generator, which obtains its energy from the flow present.

Figure 2:
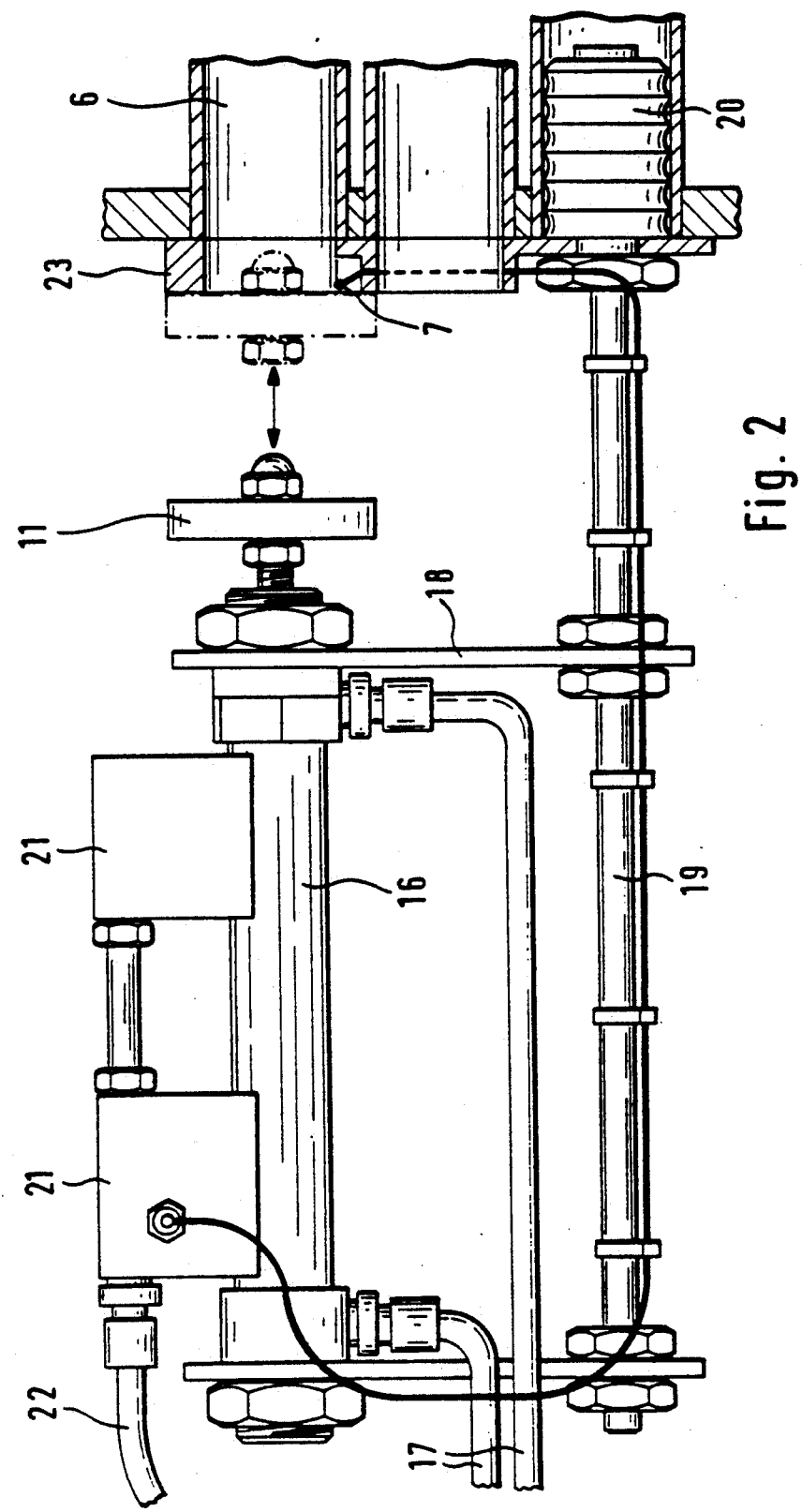
FIG. 2 a side view of part of the apparatus according to the invention for the temporary shutting off of the flow through a condenser tube to be measured.

For the temporary shutting off of the cooling water flow through a condenser tube 6 it is unimportant whether the tube inlet or tube outlet is blocked off. It is merely necessary that a blocking is possible and that the time at which flow is allowed to resume is accurately established. It should of course be ensured that with the sealing element retracted, the flow through the condenser tube 6 is not impeded by said sealing element, so that roughly the same steady states occur as in the unmeasured adjacent tubes. In FIG. 1 the movement of the sealing element 11 e.g. takes place through a lifting magnet, whose guides are sealed with the aid of diagrammatically indicated bellows. In FIG. 2, instead of this, a hydraulically or in particular pneumatically operated cylinder 16 is used, which carries at the free end of its piston rod the sealing element 11 in the form of a simple sealing disk. Operation takes place in the conventional manner by means of lines 17. The cylinder 16 is fixed by a rod 19, which is held with the aid of a clamping plug 20 within an adjacent condenser tube, which is in this case shut down.

In the embodiment shown here the flow through the condenser and therefore the measured condenser tube 6 is in the opposite direction to that of the embodiment of FIG. 1. Once again, the tube end is sealed. In addition, the arrangement of the temperature probe 7 differs from that of the previously explained embodiment. The temperature probe is bonded or otherwise sealed into a short tube extension 23 fixed to the condenser plate, so that it is located at the outermost end of the condenser tube 6. From it a signal line passes to a casing, which houses a read contact 21. It is used for monitoring the complete withdrawal path of the cylinder 16 with the sealing element 11 open, as shown in FIG. 2. With the aid of a further reed contact 21 the other extreme position of the cylinder 16 is monitored, in particular the leaving of this position at the time when flow is resumed again. The measured value of the temperature probe 7 and the position indications of the reed contacts 21 are supplied via a cable 22 to the evaluation means 12. With the sealing element 11 retracted the water inlet temperature $T_1$ and water outlet temperature $T_2$ are measured and stored in the evaluation means 12. If a control measurement is to be carried out, then the condenser tube 6 to be measured is sealed with the aid of the sealing element 11. This is illustrated in picture 3.1 of FIG. 3. The cooling action of the cooling water flowing through is missing as a result of the blockage, instead the water column 25 trapped in the condenser tube (picture 3.2) is slowly heated to the steam temperature $T_s$. The heating time can be measured, but in practice a time relay is set and at the end of the time period, e.g. 10 minutes, the sealing element 11 is retracted and therefore the condenser tube 6 again participates in the flow.

Figure 4:
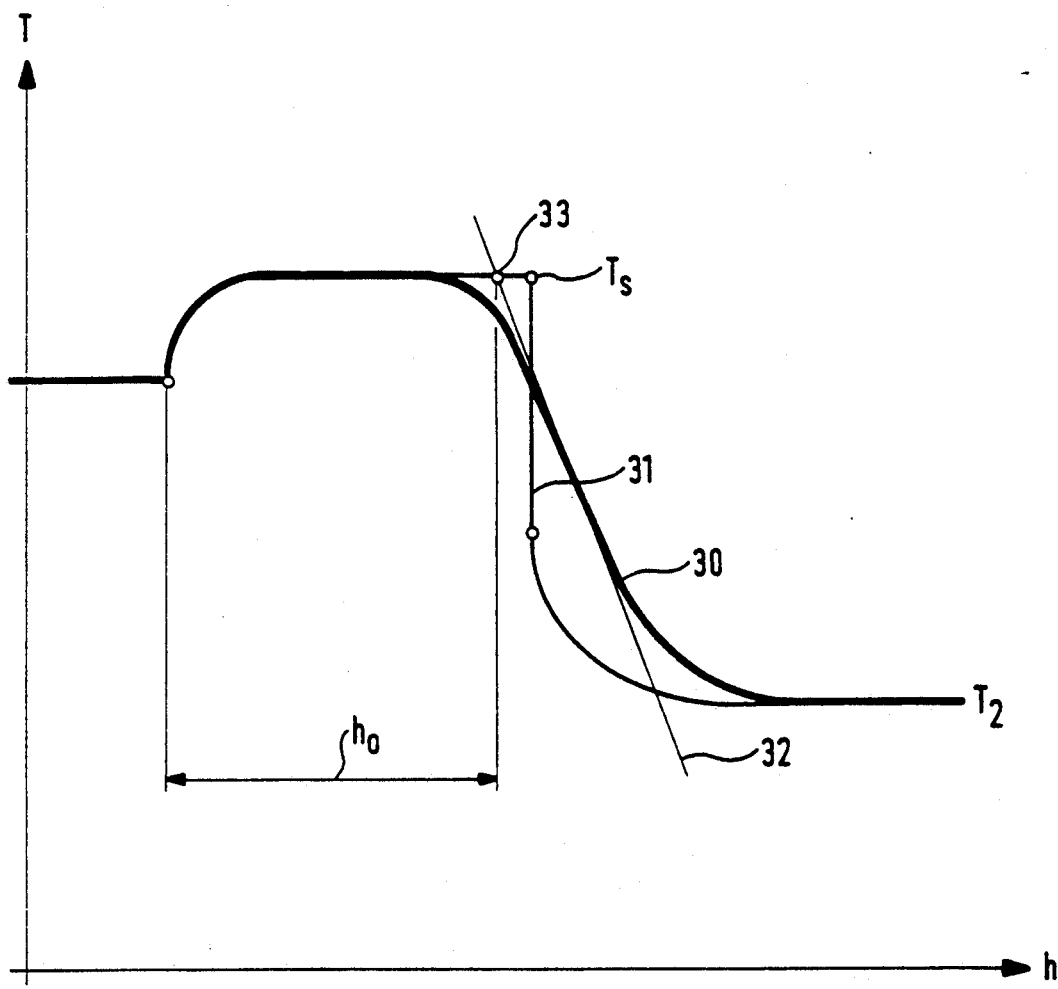
FIG. 4 a graph of the temperature over the time function from the freeing of the flow again after blocking off, during the discharge of the previously trapped water column until the normal steady state is reached.

It is obvious that when the heated water column 25 flows out, the temperature probe 7 can sufficiently accurately measure the steam temperature $T_s$. It must be stressed that the water outlet temperature $T_2$ and the steam temperature $T_s$ are measured with the same temperature probe 7, which makes a significant contribution to an accurate measurement. The temperature probe can be constituted by sheathed microthermocouples, or other temperature sensors, which act sufficiently rapidly in liquid-compatible manner and reliably cover the temperature range which occurs. In order to determine the flow velocity and therefore the cooling water quantity flow, it is necessary to measure the time which elapses from the state of picture 3.2 to the state of picture 3.4 of FIG. 3. This time is identical to the duration of the outflow of the water column 25 from the condenser tube 6 after flow has been permitted again. With the aid of this period of time the flow velocity is measured. FIG. 4 illustrates which temperature curve occurs at the temperature probe 7 and in which way especially the end of the time measurement is determined.

It is particularly easy to establish the time at which the flow resumes as a result of the movement of the sealing element 11. In the case of the apparatus according to FIG. 2 the signal of the front reed contact 21 is assumed to be the start of the period of time to be measured. In order to carry out the outflow of the water column 25 from the condenser tube 6 with the minimum disturbance, the speed of the cylinder 16 can be adjusted in such a way that it approximately corresponds to the outflow velocity of the water column 25. The start of the time period to be measured is plotted in FIG. 4 at the left-hand side of the time interval $h_o$. The temperature measured at this time by the temperature probe 7 is lower than the steam temperature $T_s$, but higher than the water outlet temperature $T_2$, because although the probe 7 is protected in the outlet of the condenser tube 6, it is exposed, as compared with the steam temperature $T_s$, to cooling influences, such as e.g. a water-cooled tube extension 23 and a water-cooled sealing element 11. After the resumption of the flow there is consequently a sudden and then an asymptotical temperature rise to the average steam temperature $T_s$, which is consequently measured just shortly after the retraction of the sealing element 11.

Under ideal conditions, i.e. in the case of a perfect separation between the water column 25, which has been brought to the steam temperature, and the streaming in water column, a temperature jump would be obtained which is shown in FIG. 4 by a vertical line 31. The following asymptotic approach to the temperature $T_2$ would also be in the indicated form under ideal conditions, because the condenser tube 6 previously heated to the steam temperature $T_s$ is slowly cooled by the freshly entering cooling water. However, the temperature pattern is in practice in accordance with the thick, continuous line 30, which reproduces the actual pattern. It is possible to define thereon a reversing point through which a tangent 32 can be placed. The tangent 32 intersects the level of the steam temperature $T_s$ in the intersection point 33 and the latter is assumed to be the end of the time period for the outflow of the water column 25 from the condenser tube 6 during the mathematical evaluation of the measured values.

It would have also been possible to use for determining the end of the time period the actual reversing point or some other point with an approximately random, reproducible definition. It is merely a question of ensuring that the connected computer is able in an acceptable period of time to calculate the end of the time period and to relate it to the length of the condenser tube 6. Taking account of the necessary acceleration to the stationary flow velocity and the corrections for mixing effects, said stationary flow velocity can be calculated. It is used as a basis for the determination of the heat absorption of the through-flowing cooling water, which is obtained from the product of the difference between the water outlet temperature $T_2$ and the water inlet temperature $T_1$ with the volume flow, the specific weight and the specific thermal capacity of the cooling water.

To avoid a mixing of the cooling water with the enclosed water column 25 with the sealing element 11 closed, it is possible to fit at the tube inlet a flap not shown, which e.g. comprises six or eight circular sectors and which opens according to flow. Of course it allows the unrestricted passage of foam rubber balls used for cleaning purposes. It is obviously also possible to provide a further forced closure here, e.g. by a further arrangement according to FIG. 2. However, this doubles the costs without improving the result to the same extent. Thus, during the outflow of the water column 25 there is still a "fraying" at the rear end of the water column, which even cannot be eliminated by a forced closure.

If the fitting possibilities do not allow a fixing of the device for sealing a condenser tube 6 to the bottom of the condenser, respectively if the checking of said device during operation is desired, it is possible to provide in line with the condenser tube 6 a tube extension through the wall of the outlet chamber 5 and to locate the closing mechanism outside the condenser. Otherwise, for this type of arrangement or for the one represented in the drawing all actuating means are at disposal, namely electro-magnets, motors with spindles, pivoted flaps, swivel flaps, etc.

In FIG. 1 it is indicated that the temperature probe 7 is riding on the sealing element 11, whereas in FIG. 2 said probe 7 is fixed to the condenser tube 6. The preferred solution is a function of the individual case. The embodiment according to FIG. 1 can only be successfully used if there are no excessive cross-flows in the condenser, but instead the water column passes in relatively undisturbed form out of the condenser tube, so that the value measured on the temperature probe 7 really indicates the water column temperature in an unfalsified form. Otherwise, it is a function of the particular case to choose the best position within the condenser 1 on the basis of experience or tests, because the size of the chambers 4 and 5, the flow velocity of the cooling water through the condenser tubes 6 and their diameter are the decisive parameters. Of course, it is also possible to house the thermometer 8 within the intake chamber 4, particularly in the vicinity of the condenser bottom on that side. However, the proximity to the condenser tube 6 to be measured is not necessary if the water flowing into the intake chamber is at a uniform temperature. This does not apply when measuring condenser tubes in the second path in the case of condensers having two (or more) paths. As in such cases the intake temperature fluctuates and is not uniformly distributed, the thermometer 8 must be positioned directly at the inlet of each tube to be measured.

Figure 5:
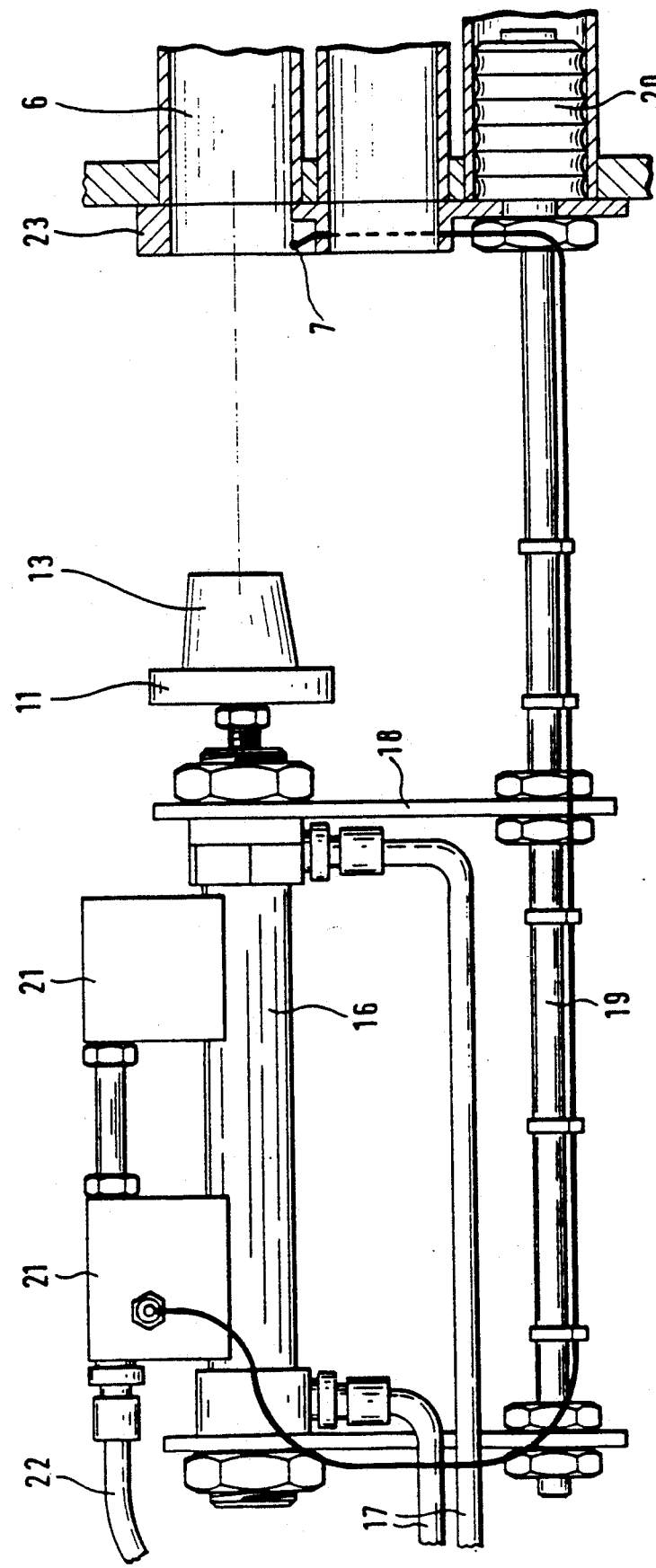
FIG. 5 a side view according to FIG. 2 with a modified sealing element.

FIG. 5 largely corresponds to FIG. 2, so that no detailed explanation will be given. The essential difference is that the rod 19 is longer and therefore the cylinder 16 is further away from the tube extension 23. On the side facing the condenser tube 6 the sealing element 11 also carries a cone 13 with the aid of which the inlet of the condenser tube 6 can be closed in a dosed manner in such a way that different flow velocities can be produced. For this purpose the sealing element 11 is not either seated on the tube extension 23 or retracted but is instead located at different distances in front of the tube extension 23. As a result of the varying cross-sectional surfaces of the cone 13 at a distance from the sealing element 11, there are different free cross-sections at the inlet of the condenser tube 6, so that cooling water speeds are obtained which are below the maximum speed obtained when the tube cross-section is completely free.

This additional device can be utilized in order to obtain an information on the heat transfer on the steam side of the condenser tube 6. It has already been stated initially how such information can be obtained with the aid of the Wilson method. It must be ensured that the heat transfer is established for different cooling water flow velocities through the condenser pipe. With the aid of said additional device by a corresponding positioning of the sealing element 11 and therefore the cone 13 within the tube extension 23, only a partial cross-section of the condenser tube 6 is freed, so that different speeds of the cooling water are obtained. The actual speed set is determined in the represented manner by allowing the water column heated to the steam temperature to flow out a few minutes following the complete closure of the corresponding condenser tube 6. Following the dosed opening at first the flow velocity is determined and subsequently, when once again steady states have been established, the heat transfer is established by the temperature comparison made between the inlet and outlet temperature.

In order to obtain utilizable information on the steam-side heat transfer, theoretically a constant state is required on the steam side for the duration of the measurement for producing the Wilson diagram. This certainly applies for conditions in which the heat transfer is impaired by fouling on the steam side, e.g. as a result of the deposition of magnetite. In the case of air inclusions the conditions change relatively rapidly, although steady states may really occur, because e.g. a certain air quantity is contained in the condenser and collects at a certain point. Generally, it is important in the first instance to establish whether the heat transfer must be improved by measures on the tube inside or whether by a persistant disturbance of the heat transfer on the steam side no further improvement of the heat transfer by a more intense cleaning of the tube inside can be achieved. It may then be necessary to accept an inferior efficiency or, during an inspection, to eliminate the problems due to the deposits on the steam side.

We claim:

1. A method for monitoring the heat transfer and, therefore, efficiency of a condenser, in which water inlet temperature $T_1$ of cooling water flowing into a condenser tube having an inlet and an outlet is measured by means of a first temperature sensor, water outlet temperature $T_2$ of said cooling water flowing out of said condenser tube is measured by means of a second temperature sensor, steam temperature $T_s$, and water flow velocity are measured, in order to calculate a heat transmission coefficient on the basis of said temperatures $T_1$, $T_2$, $T_s$, and said water flow velocity, comprising the steps of:
   temporarily interrupting water flow through said condenser tube so that a water column contained therein is heated up to said steam temperature $T_s$ as measured at said outlet of said condenser tube,
   resuming, after said water column reaches said steam temperature $T_s$, said water flow through said condenser tube, and
   measuring velocity of said water flow through said condenser tube by monitoring said water outlet temperature $T_2$ and evaluating time elapsed between said resumption of said water flow and a point in time where said water outlet temperature $T_2$ reaches approximately a previous value prior to said temporary interruption of said water flow.

2. A method as in claim 1, wherein said water flow is temporarily interrupted by closing said outlet or said inlet of said condenser tube.

3. A method as in claim 1 or 2, wherein said water flow velocity is determined by calculating a temperature reversal point, by means of a tangent to a temperature curve, of a temperature drop in said water column in said condenser tube, and measuring a time interval elapsing between resumption of said water flow and said temperature reversal point.

4. A method according to claim 1 or 2, wherein for interrupting said water flow one end of said condenser tube is forcibly closed and another end is closed automatically in a flow-dependent manner.

5. A method according to claim 1 or 2, wherein said temporary interruption and said resumption of said water flow through said condenser tube are carried out from a point outside said condenser tube through a wall of a corresponding condenser chamber.

6. A method according to claim 1 or 2, wherein for evaluating heat transfer on a steam side, several measurements are carried out at different water velocities and said measurements are evaluated according to the Wilson method.

7. Apparatus for monitoring the heat transfer and therefore efficiency of a condenser, comprising:
a thermometer in a water entrance area for determining a water inlet temperature $T_1$ of water,
a temperature probe in an end region of a specific condenser tube for determining a water outlet temperature $T_2$ and a steam temperature $T_s$, and
means for evaluating said temperatures with respect to time, computing a water flow velocity therefrom, and computing a heat transfer from steam into said water, wherein said condenser tube (6) can be temporarily shut off with the aid of a sealing element (11).

8. Apparatus according to claim 7, wherein said thermometer for determining said water inlet temperature $T_1$ of said water is positioned directly at an inlet of said condenser tube (6) to be measured.

9. Apparatus according to claim 7 or 8, wherein said sealing element (11) is arranged so as to be displaceable in a longitudinal direction of said condenser tube (6) with the aid of a pneumatically or hydraulically operable cylinder (16).

10. Apparatus according to claim 9 further comprising an access pipe in line with said condenser tube passed through a wall of said condenser (1), said sealing element being coupled to said access pipe.

11. Apparatus according to claim 9 wherein said sealing element (11) can be opened by pre-selectable amounts and therefore flow velocity through said condenser tube can be adjusted.

12. Apparatus according to claim 11, wherein said sealing element (11) carries a metering member, whose cross-sectional surface decreases with an increasing distance from said sealing element (11).

13. Apparatus according to claim 12, wherein said metering member is a cone (13).

14. Apparatus according to claim 7 or 8, wherein said sealing element (11) is positioned on an outlet side of said condenser tube.

15. Apparatus according to claim 14, further comprising an elastic flap fitted to an inlet side of said condenser tube.

16. Apparatus according to claim 14, wherein said temperature probe (7) for measuring said water outlet temperature ($T_2$) is fitted to said sealing element (11).

17. Apparatus according to claim 7 wherein said sealing element (11) is located on an inlet side of said condenser tube.

18. Apparatus according to claim 7 wherein a transmission of said water outlet temperature $T_2$ from said temperature probe (7) is carried out in a wireless manner.

19. Apparatus according to claim 18, wherein at least one battery is provided for a power supply for powering said transmission.

20. Apparatus according to claim 18, further comprising a power supply for said transmission including a generator, said generator obtaining its power from a pressure difference between an inlet and an outlet of said condenser tube or from a flow of residual water movement within said condenser.

21. Apparatus according to claim 7 further comprising a tubular mounting for an actuator for said sealing element (11), said tubular mounting being inserted in one or more adjacent tubes.

22. Apparatus according to claim 7 wherein temperature values from said temperature probe (7) for said water outlet temperature ($T_2$) can be stored at least for the duration of measurement of said steam temperature $T_s$ and can be displayed on a screen or as a print-out.

* * * * *